US006638633B1

(12) United States Patent
Komori et al.

(10) Patent No.: US 6,638,633 B1

(45) **Date of Patent: *Oct. 28, 2003**

(54) SOLVENT-RESISTANT ELECTRICAL STEEL SHEET CAPABLE OF STRESS RELIEF ANNEALING AND PROCESS

(75) Inventors: Yuka Komori, Okayama (JP); Katuro Yamaguchi, Tokyo (JP); Keiji Sato, Tokyo (JP)

(73) Assignee: Kawasaki Steel Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 5 days.

(21) Appl. No.: 08/990,211

(22) Filed: Dec. 12, 1997

(51) Int. Cl.[7] ........................ B32B 15/04; B32B 15/08; B32B 15/18

(52) U.S. Cl. ....................... 428/457; 428/632; 428/341; 428/469; 428/458; 428/460; 428/461; 428/418; 428/425.8

(58) Field of Search ................................ 148/243, 274, 148/284; 428/633, 632, 681, 340, 341, 457, 469, 471, 704, 698, 626, 630, 684, 685, 450, 621, 622, 624, 639, 640, 458, 460, 461, 472, 418, 425.8

(56) References Cited

U.S. PATENT DOCUMENTS 4,190,468 A * 2/1980 Kitayama et al. ......... 148/12 A
4,416,800 A * 11/1983 Abe et al. .................... 502/159
4,496,399 A 1/1985 Haselkorn .............. 148/6.15 R
4,560,588 A * 12/1985 Nethe et al. ................ 427/215
4,910,097 A * 3/1990 Nomura et al. ............. 428/623
4,970,126 A * 11/1990 Adaniya et al. ............ 428/623
5,061,575 A * 10/1991 Mohri et al. ................ 428/623
5,110,689 A * 5/1992 Watanabe et al. ........... 428/623
5,509,976 A * 4/1996 Yamazaki et al. .......... 148/113
5,578,669 A * 11/1996 Odawa et al. .............. 524/414
5,853,850 A * 12/1998 Iwai et al. .................. 428/148
5,942,285 A * 8/1999 Schmid ....................... 427/318
6,015,628 A * 1/2000 Urata et al. ................. 428/623
6,190,582 B1 * 2/2001 Marlowe ....................... 264/5

FOREIGN PATENT DOCUMENTS

JP 5-65667 * 3/1993

* cited by examiner

*Primary Examiner*—Michael La Villa
(74) *Attorney, Agent, or Firm*—Piper Rudnick LLP

(57) ABSTRACT

Electrical steel sheet can be produced by baking at low temperatures and is capable of stress relief annealing and has excellent solvent resistance and has an insulating coating containing substantially no chromium components harmful to environment; the electrical steel sheet has an insulating coating comprising a resin and an inorganic colloid which is silica, alumina or alumina-containing silica.

22 Claims, 4 Drawing Sheets

SOLVENT-RESISTANT ELECTRICAL STEEL SHEET CAPABLE OF STRESS RELIEF ANNEALING AND PROCESS

BACKGROUND OF THE INVENTION

1. Field of the Invention

The present invention relates to an electrical steel sheet provided with an insulating coating, specifically to such an electrical steel sheet which does not contain toxic compounds such as hexavalent chromium and can be produced by low temperature-baking, which is capable of stress relief annealing and has good solvent resistance. The invention further relates to the process of making the electrical steel sheet.

2. Description of the Related Art

Not only surface insulation but other convenience characteristics in processing/molding, storage and use are required of insulating coatings on electrical steel sheets used for motors and transformers. The required characteristics include punchability, TIG welding properties, adhesion property, corrosion resistance, solvent resistance, heat resistance, anti-blocking properties, anti-tension pat properties, and retention of corrosion resistance and sticking resistance after stress relief annealing.

Electrical steel sheets are subjected to stress relief annealing at 750 to 850° C. in many cases in order to improve the magnetic characteristics of the sheet after stamping. Insulating coatings are accordingly often required to withstand stress relief annealing. Accordingly, various insulating coatings have been developed for specific electrical steel sheets used in particular ways.

Insulating coatings are usually divided into three kinds:

(1) an inorganic coating which withstands stress relief annealing and has good welding properties and heat resistance.

(2) a semi-organic coating which withstands stress relief annealing and intends to achieve both good punchability and good welding properties, and (3) an organic coating which is limited to specific uses and cannot be annealed.

Among them, coatings (1) and (2) withstand stress relief annealing and are useful as general purpose products. In particular, chromate base insulating coatings containing an organic resin can be formed in one step comprising one coat and one bake, and have particularly excellent punchability as compared with that of an inorganic insulating coating. Such coating is therefore widely used.

A production process for an electrical steel sheet having a chromate base insulating coating is disclosed in, for example, Japanese Examined Patent Publication No. 60-36476. A processing liquid is applied on the surface of a base steel sheet. The processing liquid is prepared by blending a bichromate base aqueous solution containing at least two kinds of divalent metals with a resin emulsion having a vinyl acetate/VEOVA ratio of 90/10 to 40/60 as an organic resin in an amount of 5 to 120 parts by weight in terms of solid resin and an organic reducing agent in an amount of 10 to 60 parts by weight each per 100 parts by weight of $CrO_3$ contained in the aqueous solution described above. Baking is carried out conventionally.

This electrical steel sheet, provided with an insulating coating, satisfies various performance requirements including corrosion resistance and solvent resistance. However, a chromate base coating has to be baked at a relatively high temperature in order to reduce hexavalent chromium to trivalent chromium in order to insolubilize it. Baking at high temperatures increases cost and energy consumption, and reduction in processing rate.

In the case of a semi-organic coating containing a resin, the resin degrades under baking at high temperatures, damaging the intrinsic performance of the resin. Further, hexavalent chromium causes concern about the problem of environmental pollution and involves cost expended for exhaust processing and waste solution processing.

Semi-organic insulating coatings contain a resin with phosphate added as a principal component. However, phosphate has to be baked at high temperatures after coating in order to promote dehydration of phosphate to insolubilize it. It therefore faces the same problem as the chromate base coating.

Some insulating coatings are capable of being baked at relatively low temperatures. A method is known in which latent heat of continuous annealing is utilized to form a coating before skin pass rolling to thereby form a coating for preventing sticking in stress relief annealing. Japanese Examined Patent Publication No. 59-21927 shows a method using an aqueous solution prepared by adding a water-soluble or emulsion-type resin with an inorganic colloidal material added as a principal component is applied, and then skin pass rolling is carried out. This method makes it possible to carry out baking at low temperatures with certainty as compared with a chromate base or a phosphate base coating, wherein a film-forming reaction for insolubilizing water soluble materials has to be promoted in order to prevent sticking. No such step is necessary for inorganic colloidal materials. Among other colloidal materials, silica completes the dehydration reaction at a reduced temperature and therefore is advantageous in low temperature-baking.

Japanese Unexamined Patent Publication No. 54-31598 discloses an electrical steel sheet provided with a heat resistant and sticking resistant coating containing organic material with silica gel added as a principal component. This is done by applying a processing liquid comprising silica hydrosol and an organic material and heating it at 100 to 350° C., and surface treatment. This is an example of a semi-organic insulating coating capable of baking at relatively low temperatures and containing no chromic acid.

However, while the insulating coatings formed by the conventional methods described above are effective for preventing sticking in skin pass rolling and stress relief annealing, they have inferior solvent resistance. In processing, electrical steel sheets often contact organic solvents. This happens during rinsing with solvents, and contacts with cooling media (flon and the like) and various oils (punching oil, insulating oil and refrigerator oil). Therefore the insulating coatings of a good electrical steel sheet have to have good solvent resistance in addition to the other qualities heretofore discussed.

As is apparent from the examples in Japanese Unexamined Patent Publication No. 54-31598, no rust was produced in a wet test in a set of comparative examples containing chromate, but pitting corrosion was caused in all of the examples of the invention. Corrosion resistance is not described in Japanese Examined Patent Publication No. 59-21927, and therefore we investigated the performances of its electrical steel sheets. We have found that the corrosion resistance and solvent resistance of those sheets did not satisfy the performance parameters of chromate base general purpose coatings.

Further, the conventional methods described above result in inferior performance upon exposure to steam. Electrical steel sheets are often shipped through geographic locations having high temperature and high humidity. Further, when the electrical steel is incorporated into a motor and the motor is heated to a high temperature, in the presence of high humidity, resistance to steam is required in many cases.

As shown in conventional techniques, inorganic colloidal silica has excellent heat resistance and is very effective for preventing a steel sheet from sticking. However, silica has had the defects that silica alone has weak adhesion property to steel sheet, and has inferior lubricating properties and inferior punchability. It also has a weak covering capability and allows corrosion readily to occur. On the other hand, organic resins have characteristics opposed to those of inorganic colloidal silica. While organic resins have excellent punchability and adhesion property, they have inferior heat resistance. Accordingly, an insulating coating of an organic-inorganic mixed composition intended to have both advantages has been developed. As described above, however, many important coating characteristics needed for electrical steel sheets have not yet been attained.

One object of the present invention is to provide an electrical steel sheet provided with an insulating coating which can be produced by baking at low temperatures, and is capable of stress relief annealing, and has excellent solvent resistance, and contains substantially no objectionable chromium component.

Another object of the present invention is to provide an electrical steel sheet provided with an insulating coating which can be produced by baking at low temperatures and is capable of stress relief annealing and which has excellent corrosion resistance.

Another object of the present invention is to provide an electrical steel sheet provided with an insulating coating which can be produced by baking at low temperature and is capable of stress relief annealing and which has excellent steam exposure resistance.

Another object of the present invention is to provide a process for producing a non-oriented electrical steel sheet which can be produced by baking at low temperature and is capable of stress relief annealing, and which has excellent punchability and sticking resistance after annealing.

Further, the present invention provides an electrical steel sheet having an insulating coating which is excellent in all of the characteristics necessary for a variety of the performance criteria of electrical steel sheet, including adhesion property, sticking resistance and good film-forming and welding properties.

SUMMARY OF THE INVENTION

The present invention provides an electrical steel sheet fulfilling the foregoing objects. It is capable of stress relief annealing and has excellent solvent resistance and has an insulating coating containing a resin and an inorganic colloid which comprises silica or alumina or alumina-containing silica.

It can be made by baking the insulating coating at a low temperature, that is, a steel sheet temperature of about 50 to 250° C. When the inorganic colloid is silica, the insulating coating contains at least one alkaline metal selected from the group consisting of Li, Na and K in an amount of about 0.1 to 5 parts by weight expressed as $M_2O$ (M: alkaline metal) per 100 parts by weight of silica expressed as $SiO_2$.

Preferably, Cl is present in the insulating coating in an amount of about 0.005 part by weight or less, and S is present in an amount of about 0.05 part by weight or less each per 100 parts by weight of silica expressed as $SiO_2$; and silica is present in an amount of about 3 to 300 parts by weight, expressed as $SiO_2$, per 100 parts by weight of the resin.

It is further preferable that the resin contained in the insulating coating has a glass transition temperature of about 30 to 150° C.

In the process of applying a coating liquid to the steel sheet, water is present as a solvent in which about 30 to 300 parts by weight of a colloidal silica solid material is blended with 100 parts by weight of a water base dispersed resin solid material, and in which the surface area (specific area×solid matter weight) of the colloidal silica solid particles is controlled to about 0.2 to 10 times the surface area (specific area×solid matter weight) of the solid resin particles. The coating liquid is baked on the steel sheet and an excellent coated electrical steel sheet is obtained.

The inorganic colloid contained in the insulating coating can be alumina, and the resin has a glass transition temperature of about 30 to 150° C. The inorganic colloid contained in the insulating coating can be alumina-containing silica, and the resin also has a glass transition temperature of about 30 to 150° C. An organic acid is preferably present in the insulating coating as a stabilizing agent; the colloid may be alumina or alumina-containing silica in an amount of about 3 to 300 parts by weight expressed as $Al_2O_3+SiO_2$ per 100 parts by weight of the resin; and the amount of alumina contained in the insulating coating is about 0.01 to 500 parts by weight expressed as $Al_2O_3$ per 100 parts by weight of silica expressed as $SiO_2$.

The amount of the insulating coating on the electrical steel sheet of the present invention is preferably about 0.05 to 4 g/m$^2$.

To report corrosion resistance results the symbol @ means "0 to 20%," the symbol ○ means "20–40%," the symbol Δ means "40–60%" and the symbol x means "60–100%."

Figure 2:
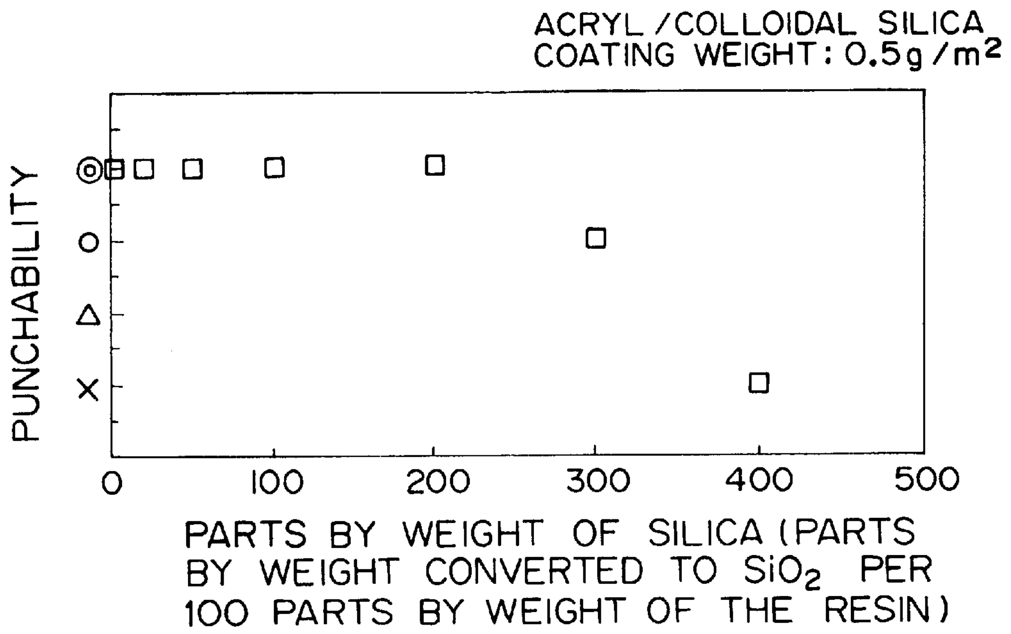

FIG. 2 is a drawing showing the effect of colloidal silica upon punchability of the coated steel sheet according to this invention. The symbol a means "over 500,000 times,n the symbol ○ means "300,000 to 500,000 times," the symbol Δ means 100,000–300,000 times" and the symbol x means "less than 100,000 times."

Figure 3:
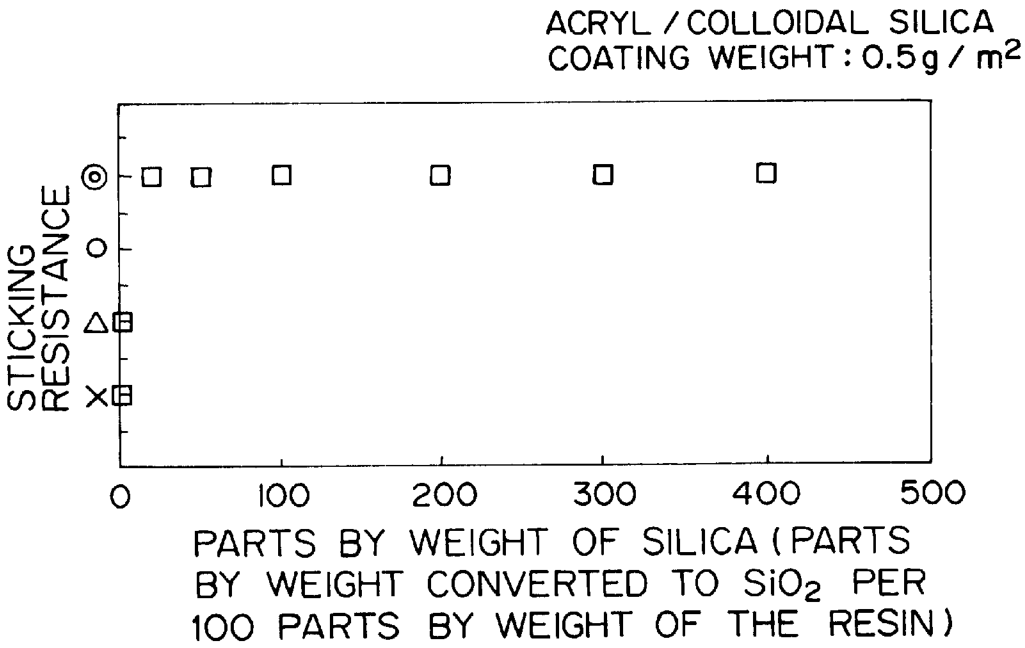

FIG. 3 is a drawing showing the effect of weight of colloidal silica in relation to quality of sticking resistance. The meaning of the symbols is ◎: 10 cm or less ○: 10 to 15 cm Δ: 15 to 30 cm x: over 30 cm.

Figure 4:
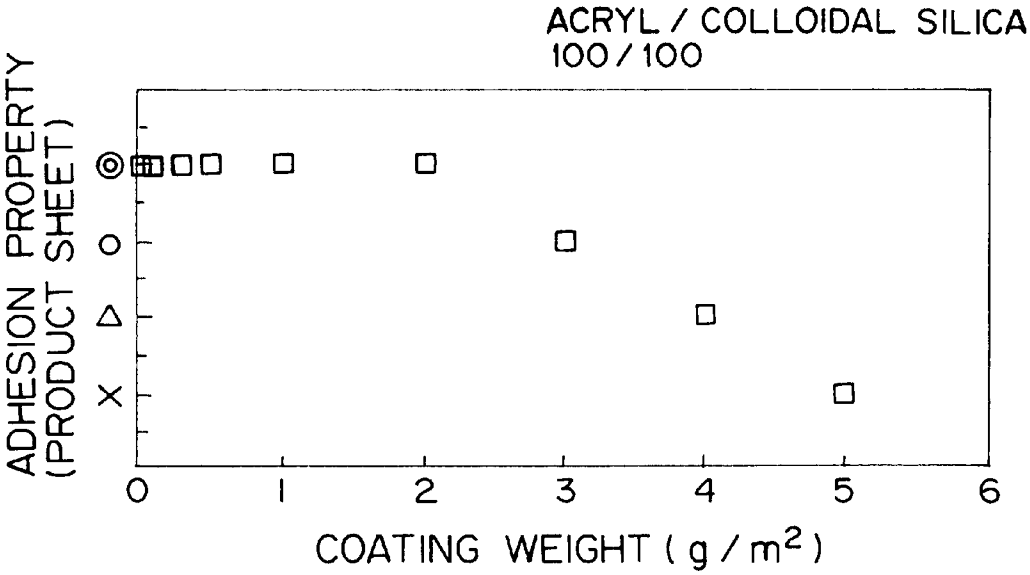

FIG. 4 is a drawing showing the effect of the acryl/colloidal silica coating weight upon adhesion property of the product sheet. The meaning of the symbols in FIG. 4 is ◎: no peeling off ○: peeled off by 20%

Δ: peeled off by 20 to 40% x: peeled off by 40% to whole surface.

Figure 5:
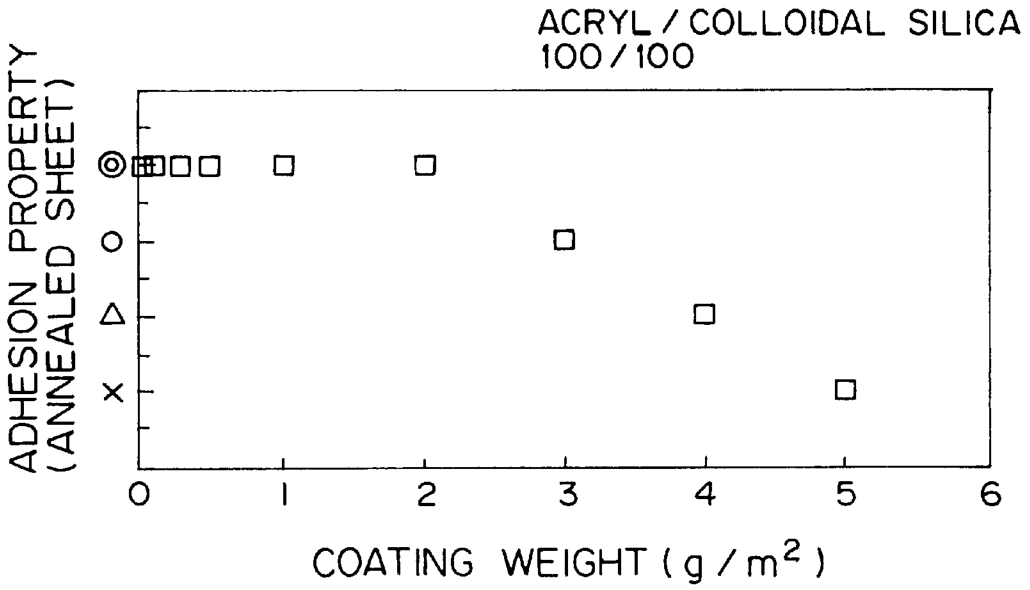

FIG. 5 is a drawing showing the effect of acryl/colloidal silica coating weight upon the adhesion property of the annealed coated sheet. The symbols have the same meaning as in FIG. 4.

Figure 6:
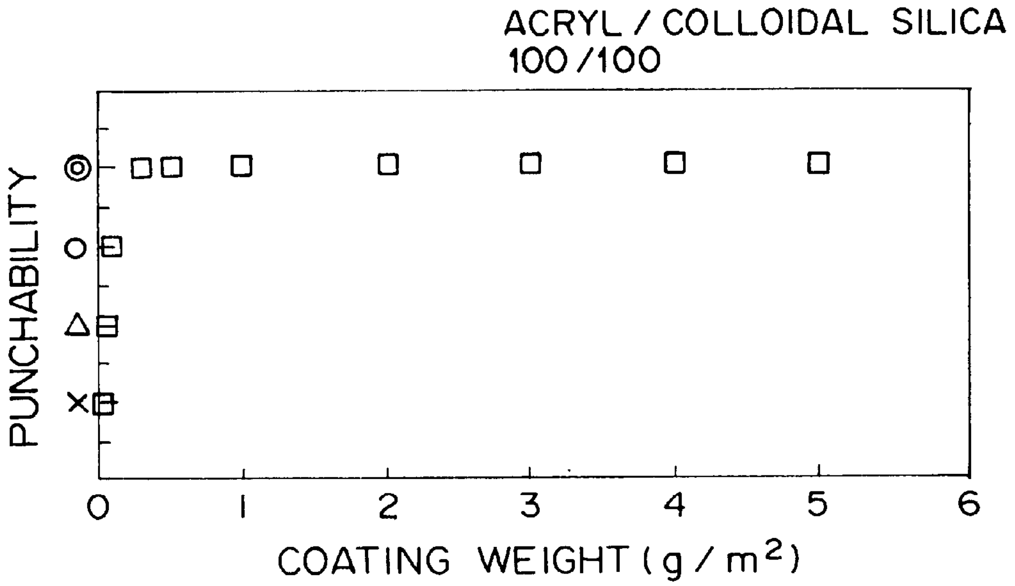

FIG. 6 is a drawing showing the effect of an acryl/colloidal silica coating weight upon punchability of the coated steel sheet. The symbols have the same meanings as in FIG. 2.

Figure 7:
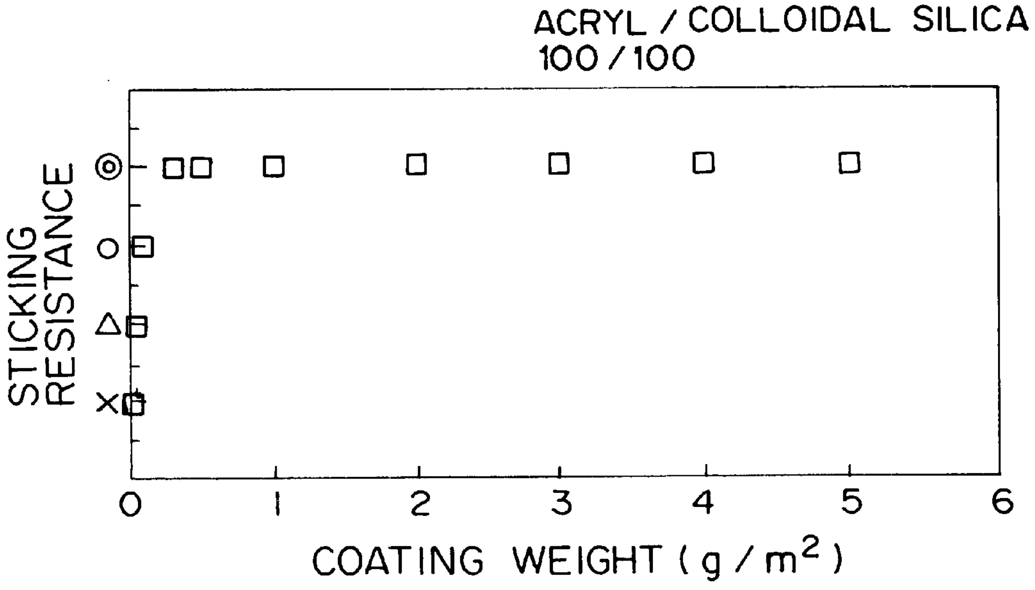

FIG. 7 is a drawing showing the effect of acryl/colloidal silica coating weight upon sticking resistance. The symbols have the same meanings as in FIG. 3.

DETAILED DESCRIPTION OF THE PREFERRED EMBODIMENTS

The electrical steel sheet of the present invention provided with an insulating coating (hereinafter referred to as "the electrical steel sheet of the present invention") shall be explained below in detail.

Steel Sheet

The composition of the base steel sheet for the electrical steel sheet of the present invention is not specifically restricted; steel sheets having various compositions can be used. Common steel containing little or no Si, as well as ordinary electrical steel sheets, can be used.

Resin

The solvent resistance of a resin/inorganic colloid blend base in baking at low temperatures has been investigated in detail. We have discovered that the solvent resistance of the coated steel is strongly affected particularly by the resin itself. More particularly, we have discovered that in the case of baking at low temperatures of about 50 to 200° C, the crosslinking reaction of the resin caused by blending a crosslinking agent is difficult to conduct. Accordingly, considering that it is important to maximize the solvent resistance of the resin itself, we have discovered that the solvent resistance surprisingly becomes excellent when the resin has a glass transition temperature of about 30° C. or higher. Further, film formability in baking at low temperatures can be achieved by lowering the glass transition temperature of the resin to about 150° C. or lower.

Accordingly, the resin blended into the processing liquid is a water base resin (emulsion, dispersion, or water solution), and the resin having a monomer composition which provides a glass transition temperature of about 30 to 150° C., preferably about 40 to 130° C., is used. If the glass transition temperature of the resin is lower than about 30° C., the solvent resistance of the coating is poor, and if it exceeds about 150° C., the film formability in baking at low temperatures is inferior. Accordingly, the resin having a glass transition temperature of about 30 to 150° C. is preferred.

The resin composition used here is not specifically restricted. Suitable examples include at least, one organic resin selected from the group consisting of acryl resins, alkyd resins, polyolefin resins, styrene resins, vinyl acetate resins, epoxy resins, phenol resins, urethane resins, melamine resins and polyesters. The resin preferably has a monomer composition giving a glass transition temperature falling in a range of about 30 to 150° C. The glass transition temperature of the resin is fixed according to the monomer composition and is a characteristic intrinsic in the resin. Usually, the resin is conveniently obtained by combining several kinds of monomers.

Any resin compositions can be applied, when suited to the present invention, as long as it has a glass transition temperature falling in the range of about 30 to 150° C. In the case of resins having an indistinct glass transition temperature, the softening point thereof may be about 30 to 150° C. The resin changes in properties to a large extent at temperatures lower or higher than the glass transition temperature, and therefore its glass transition temperature is preferably higher than the environmental temperature.

Various methods can be used for determining the resin glass transition temperature and include, for example, DSC (differential scanning calorimeter), TMA (thermal mechanical analysis), thermal expansion and the like but selection of one or another is not specifically restricted. The glass transition temperature can be determined by making use of change of physical properties to a large extent. Further, the glass transition temperature of a copolymer can be calculated and therefore may be calculated from the composition when the glass transition temperature is difficult to measure.

Inorganic Colloid

In the present invention, the inorganic colloid comprises at least one of silica or alumina, or alumina-containing silica, or any mixtures of them.

Silica

The type of silica which is a component of the insulating coating is not specifically restricted. It may be produced by any suitable method but should be dispersable in water. Various embodiments such as colloidal silica, vapor phase silica and coagulation type silica can be used.

Silica is present in the insulating coating preferably in a proportion of about 3 to 300 parts by weight in terms of $SiO_2$ to 100 parts by weight of the resin. If the amount of silica is less than about 3 parts by weight, the resin is thermally decomposed under the influence of stress relief annealing, and the remaining coating is small. In that event the steel performance in terms of sticking resistance and corrosion resistance becomes poor after annealing. Alternatively, if the amount of silica exceeds about 300 parts by weight, the punchability and the adhesion property of the coating and steel are adversely affected.

Alkaline Metal

We have discovered that the presence of an alkaline metal provides remarkable results if added effectively for elevating the solvent resistance of the resin/silica base insulating coating.

It has been considered that since silica itself has excellent solvent resistance, the solvent resistance of the insulating coating can be further increased by elevating the solvent resistance of the resin itself and causing good crosslinking of the silica with the resin. We have discovered that it is effective for elevating the solvent resistance of the resin itself to raise the glass transition temperature of the resin. Good performance is shown at a glass transition temperature of about 30° C. or higher, but a resin having a glass transition temperature of about 30° C. may be slightly damaged, though not seriously, in some cases depending on specific natures of solvents.

In this case, silica containing an alkaline metal achieves even better solvent resistance than with the resin alone. This mechanism is not clear, but it is contemplated that the alkaline metal may act as a metal crosslinking agent for promoting crosslinking of the silica with the resin.

The content of alkaline metal contained in the insulating coating is in a proportion of about 0.1 to 5 parts by weight, preferably about 0.1 to 3 parts by weight expressed as $M_2O$ (M: alkaline metal, $Li_2O$, $Na_2O$, $K_2O$) per 100 parts by weight of silica expressed as $SiO_2$. If the amount of the alkaline metal is less than about 0.1 part by weight, the solvent resistance is poor, and if it exceeds about 5 parts by weight, the solvent resistance of the coating cannot be expected to rise any further. In particular, if Na and K are added in excess as the alkaline metals, sodium silicate and potassium silicate are produced on the surface of the silica to cause a waterproofing problem in some cases. In the case of colloidal silica, a stable area of pH is present. Accordingly, when colloidal silica is used, the pH may be adjusted by adding ammonia if the amount of alkaline metal is small and the pH stays in a neutral unstable area. Further, alkaline metal may be added later to a coating liquid blended with the resin and silica.

Low Cl and S

We have investigated in detail and have confirmed that the electrical steel sheet, and the corrosion resistance of the electrical steel sheet after stress relief annealing, are strongly affected by the kind of silica used. In particular, we have discovered that the smaller the amounts of the anions $Cl^-$ and $SO_4^{2-}$ that are present in the silica, the better. It has been found that the electrical steel sheet and its corrosion resistance after annealing can be improved by controlling the amounts of Cl and S base on the amount of $SiO_2$ to lower limits.

Anions such as $Cl^-$ and $SO_4^{2-}$ are preferably removed in advance from silica used in the present invention and pure water is preferably used for water and dilution water in synthesizing a resin. This controls the amounts of Cl and S contained in the insulating coating to about 0.005 part by weight or less and about 0.05 part by weight or less respectively per 100 parts by weight of $SiO_2$. If the amounts of Cl and S contained in the insulating coating exceed the amounts described above, the electrical steel sheet and the corrosion resistance of the electrical steel sheet after annealing are lowered.

Surface Area

Further, we have investigated in detail the effect of the resin-silica mixed coating upon corrosion resistance. As a result we have found that corrosion resistance changes to a large extent according to the coating structure, and that particularly when the resin is a water base dispersed resin having a grain diameter, its coating structure is related to the amount of surface area that is presented by an organic resin comprising fine particles dispersed in the processing liquid and by the particles of colloidal silica.

The dispersion medium is fundamentally water, and it is practically no problem if surfactants and other dispersion media are added for preventing the resin from coagulation. To roughly divide the types of the water base resins, these may be referred to as the water soluble type, the dispersion type and the emulsion type. Any of these types can be used. The concentration of the resin solid matter is about 10 to 50% by weight.

When the resin blended with silica is a water base dispersed resin having a particle diameter, the specific surface area of these resin particles dispersed in water falls suitably in a range of about 40 to 600 $m^2/g$ considering the change of the coating structure caused by mixing colloidal silica, as described later.

The resin composition is not specifically limited; it can be selected from alkyd resins, phenol resins, 10 polyester resins, vinyl acetate resins, epoxy resins, polyolefin resins, styrene resins, acryl resins and urethane resins, for example.

Another component constituting the insulating coating according to the present invention is silica. Silica may 15 have any form. Colloidal 'silica, vapor phase silica and the like can be applied. The shape of silica is preferably colloidal silica using water as a dispersion medium, and its specific surface area falls preferably in a range of about 20 to 500 $m^2/g$, more preferably about 30 to 100 $m^2/g$. The amount of water is not specifically restricted, and about 20 to 40% by weight of silica in terms of a solid content is usually present in colloidal silica. Colloidal silica of either an alkaline type or an acid type can be used as long as it is compatible with the water base dispersed resin having the composition described above. For example, silica of an acid type can be used by adjusting the pH with a hydroxide of an alkaline metal and ammonia, and particularly excellent solvent resistance can be obtained by using a hydroxide of an alkaline metal. With respect to the addition amount, colloidal silica is suitably used in a proportion of about 30 to 300 parts by weight, preferably about 50 to 200 parts by weight in terms of silica solid matter per 100 parts by weight of the solid resin. If the amount of the colloidal silica is less than about 30 parts by weight, the sticking resistance in stress relief annealing is not necessarily satisfactory. Meanwhile, if the amount of the colloidal silica exceeds about 300 parts by weight, the film-formability is inferior in every respect, and the adhesion property and the corrosion resistance of the coating tends to be degraded, and excellent punchability which is a characteristic of the present invention is not displayed.

It is an important requisite for obtaining a coating having excellent corrosion resistance in baking at low temperatures for a short time, with a water base dispersed resin and colloidal silica used as the principal components according to the present invention, to control the ratio of the surface area (specific area $m^2/g\times$solid content weight) held by the colloidal silica grains contained in the processing liquid to the surface area (specific area $m^2/g\times$solid content weight) held by the water base dispersed resin grains to the specific range.

Figure 1:
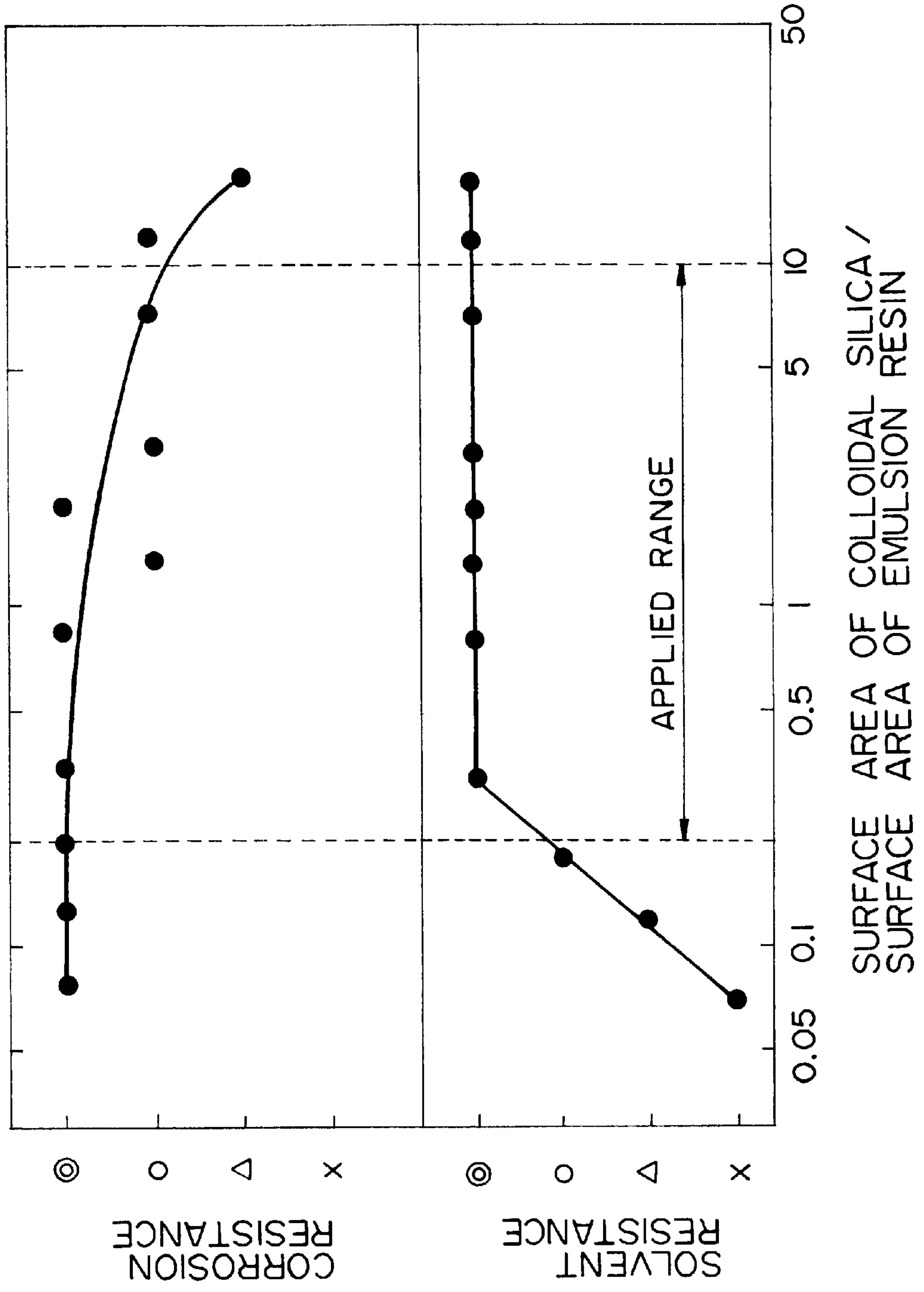
FIG. 1 is a drawing showing corrosion resistance and the solvent resistance of a product sheet (before annealing) versus the ratio of surface area held by colloidal silica to the surface area held by the water base resin. In this drawing the symbol ◎ means "no change," the symbol ○ means "little change," the symbol Δ means "slight change," and the symbol x means "large change" to report solvent resistance.

Turning now to a specific description of the drawings:

FIG. 1 is a graph of the results obtained by measuring the product sheet corrosion resistance and solvent resistance of a coating obtained by coating a processing liquid obtained by blending 100 parts by weight of a solid resin in the form of an epoxy/acryl base emulsion resin having a different surface area with 100 parts by weight of a solid colloidal silica having a different surface area, with a target of 0.5 $g/m^2$ per unit area of 1 $m^2$. The product sheet corrosion resistance and solvent resistance were evaluated by the method described in Example 1. The specific surface areas of the emulsion resin and the colloidal silica were determined from the measured values of the average particle diameters obtained by observation under an electron microscope according to the Stokes calculation equation. As is apparent, even when the resin and silica were used in a solid content ratio falling in the suitable range described above, the coating had inferior corrosion resistance and solvent resistance when the ratio of the surface area presented by the colloidal silica to the surface area presented by the water base dispersed resin did not satisfy the range of the present invention.

The cross-sectional structure of a coating formed by baking at low temperatures was observed under an electron microscope under two conditions wherein the surface area of the colloidal silica grains contained in the processing liquid was (1) about 13 times or (2) about 1.8 time as large as the surface area of the emulsion resin particles.

The processing liquid had a proportion of 150 parts by weight of the solid colloidal silica to 100 parts by weight of the solid emulsion resin, and the baking temperature was controlled to 150° C. as an achievable sheet temperature.

In the case of the ratio 13, silica was observed in the form of a layer around the tabular emulsion resin.

That is, a dotted structure was formed in which the resin particles were dotted in the silica layer. In the case of baking at low temperatures of 100 to 300° C., silica itself has weak film formability, and the bonding power between the particles is small. Accordingly, it is believed that such coating structure was formed. Such coating structure did not have a good protective property against external 20 atmosphere, and rust readily formed in a high humidity environment.

On the other hand, in the case of the ratio 1.8, a coating structure was formed in which the resin and silica were finely dispersed separately. It is considered that the resins are apt to be bonded to each other even during low temperature-baking, and therefore such structure is formed. Such coating structure has good protective effect against the external atmosphere and provides good corrosion resistance.

It is considered that if the surface ratio of silica is less than about 0.2 time, a structure in which the silica particles are dotted in the resin layer is formed contrary to the case of (1) and that while this is advantageous for the purpose of corrosion resistance, the solvent resistance of the coating is degraded.

As is apparent from the Examples of the present invention set forth herein, the proportion of the surface area of the silica satisfying the corrosion resistance and the solvent resistance falls in a range of about 0.2 to 10 times, preferably about 0.5 to 5 times.

Alumina

We have discovered that if the resin has a glass transition temperature of about 30 to 150° C., good solvent resistance of the resin itself can be achieved. Further, inorganic materials which can be produced by baking at low temperatures, and which do not lower steam exposure resistance, have been investigated. As a result we have found that marked steam exposure resistance can be obtained by using alumina in combination with the resin. It has been found that the steam exposure resistance of the coating can be improved by combining both.

Further, alumina can be compounded in order to make it possible to carry out stress relief annealing without reducing the steam exposure resistance of the coating. The amount of alumina is preferably about 3 to 300 parts by weight expressed as $Al_2O_3$ per 100 parts by weight of the resin. If the amount of alumina is less than about 3 parts by weight, the resin tends to be thermally decomposed in stress relief annealing, and therefore the remaining coating is reduced, so that its sticking resistance is lowered. Meanwhile, if the amount of alumina exceeds about 300 parts by weight, punchability is reduced.

Alumina blended into the processing liquid may be produced by any method as long as it can be dispersed in water. Accordingly, products having various forms such as alumina sol, alumina flower and the like can be applied.

When alumina sol is used, organic acids are preferably used as an acid stabilizing agent. If inorganic acids other than organic acids, for example, hydrochloric acid and nitric acid are used, $Cl^-$ and $NO_3^-$ ions remain in the coating and this markedly reduces corrosion resistance, and rust is produced in some cases even upon leaving the steel standing in the ambient air for a short time. This can be prevented to some extent by adding rust preventives but can markedly be overcome by using an organic acid as the stabilizing agent. With respect to the kind of organic acid, various carboxylic acids such as formic acid, acetic acid and propionic acid can suitably be employed, and the carbon number and other functional groups are not specifically restricted as long as they have at least one—COOH group and are water soluble. When organic acids are used, usually, the organic acids scarcely remain in the coating after baking, and therefore the organic acids can not be detected in the product. However, the levels of $Cl^-$ and $NO_3^-$ ions are very much reduced.

Alumina-containing Silica

We have found that a coating possessing both the excellent steam exposure resistance of alumina and the excellent corrosion resistance of silica can be obtained by introducing alumina-containing silica in place of alumina in the coating.

Alumina-containing silica as used in the present invention is a mixture of prescribed amounts of alumina and silica; preferably the surface of silica is covered with a minimum amount of alumina in the insulating coating.

Organic acids are preferred as the stabilizing agent for alumina, as is also the case with using alumina in the form of an inorganic colloid. The amount of stabilizing agent may fall in a range in which a charge on the surface of alumina is neutralized to stabilize the liquid. An amount of about 70 to 130% in terms of neutralization rate is preferred. This improves the corrosion resistance before and after annealing.

The amount of alumina-containing silica is about 3 to 300 parts by weight, preferably about 10 to 300 parts by weight expressed as $Al_2O_3+SiO_2$ per 100 parts by weight of the resin. If the amount of alumina-containing silica is less than about 3 parts by weight, the resin tends to thermally decompose in stress relief annealing, and therefore the amount of remaining coating is reduced, so that the sticking resistance of the coating is lowered. If the amount of alumina-containing silica exceeds about 300 parts by weight, the punchability of the coating is reduced.

We have further discovered that the desired steam exposure resistance and corrosion resistance after annealing can be achieved by selecting a resin having good steam exposure resistance and controlling the amount of alumina to about 0.01 part by weight or more per 100 parts by weight of silica. The more the ratio of alumina to silica increases, the more the corrosion resistance after annealing tends to be reduced. Therefore the amount of alumina is about 500 parts by weight or less, preferably about 1 to 300 parts by weight and more preferably about 1 to 100 parts by weight per 100 parts by weight of silica.

The reason why alumina has excellent steam exposure resistance is not apparent, but is contemplated as being due to a difference in particle charge between alumina and silica, or to a difference in minuteness of the coating.

When corrosion resistance after annealing is not required, the amount of silica may be small, but since alumina does not yet complete dehydration reaction by baking at low temperatures of 150° C. or lower, the TIG welding property is damaged in baking at low temperatures in a certain case. Accordingly, when baking at low temperatures and when the TIG welding property is important, the amount of silica in the alumina-containing silica is effectively increased.

The steam exposure resistance and the solvent resistance in baking a resin/inorganic colloid blend at low temperatures have been investigated by us in detail. It has been found that these properties are excellent when the glass transition temperature of the resin is about 30° C. or higher. Further, it has become possible to obtain a good film formability in baking at low temperatures by employing a resin having a glass transition temperature of about 150° C. or lower.

The resin composition used here is not specifically restricted.

Resins having any compositions can be used in practicing the present invention as long as they have a glass transition temperature falling in a range of about 30 to 150° C. For resins having an indistinct glass transition temperature, the softening point may fall in a range of about 30 to 150° C.

Alumina-containing silica compounded into the processing liquid may be produced by various methods as long as it can be dispersed in water, and the products having various forms such as colloid and powder can be applied.

Coating Amount, Applying Method and Baking Method

Coating Amount

In the electrical steel sheet of the present invention, the amount of the insulating coating is preferably about 0.05 to 4 $g/m^2$ expressed as dried weight per single coated surface. A coating in an amount of less than about 0.05 $g/m^2$ makes the coating uneven and allows some base metal to be exposed, and therefore the sticking resistance, the steam exposure resistance and the corrosion resistance become poor. On the other hand, a coating amount exceeding about 4 $g/m^2$ brings about blistering in drying at low temperatures to reduce the coating property. Accordingly, the coating amount of the insulating coating is preferably about 0.05 to 4 $g/m^2$, more preferably about 0.1 to 2 $g/m^2$ based upon dried weight per single coated sheet surface.

Applying Method

The electrical steel sheet of the present invention can be provided with an insulating coating formed by applying a processing liquid prepared by compounding the resin described above, silica and alkaline metal, and additives used according to necessity on the surface of a base steel sheet and then baking it. The method for applying the processing liquid is not specifically restricted; various methods such as roll coating, flow coating, spray coating, knife coating and the like can be applied.

Baking Method and Baking Conditions

The baking method is not specifically restricted either. Various methods usually used such as hot blast, infrared irradiation, induction heating and the like can be applied. Heating at such low temperatures that water contained in the coating is vaporized is enough for the baking temperature. Baking can be carried out at low achievable steel sheet temperatures as, for example, about 50 to 250° C., preferably about 80 to 250° C. and more preferably about 120 to 250° C. for a short time of 1 minute or shorter.

EXAMPLES

The present invention shall more specifically be explained below with reference to examples within the scope of the invention and comparative examples outside its scope.

Example 1

Coating liquids containing resins, silica and alkaline metals and in which the amounts of Cl and S were controlled, were applied on the surface of an electrical steel sheet having a thickness of 0.5 mm by means of a roll coater, and were baked at an achievable sheet temperature of 150° C., followed by cooling to form insulating coatings as shown in Table 1, whereby electrical steel sheets provided with insulating coatings were produced.

The electrical steel sheets were evaluated or measured for solvent resistance, punchability, corrosion resistance and adhesion property before and after stress relief annealing, and for sticking resistance, all according to the following methods. The evaluation results of the solvent resistance and the corrosion resistance of the product sheets and the annealed sheets are shown in Table 1. They further show in FIG. 2 to FIG. 7 respectively, the effect of silica amounts on punchability, the effect of silica amounts on sticking resistance, the effect of coating weights upon adhesion property of the product sheets and annealed sheets, the effect of the coating weights relating to punchability, and the effect of the coating weights on sticking resistance.

Solvent Resistance

Absorbent cotton prices were soaked with various solvents shown in Table 1 and were caused to reciprocate five times back and forth along the surfaces of the coatings. Changes in appearance were observed to evaluate the solvent resistance according to the following criteria:

◎: no change

○: little change

Δ: slight change x: large change

Punchability

A 15 mm ϕ steel die having a burr height controlled to 10 μm was used to punch various electrical steel sheet samples with standard punches. The number of punches applied to reach a burr height of 50 μm was determined. Punchability were evaluated according to the following criteria:

◎: over 500 thousand times

○: 300 thousand to 500 thousand times

Δ: 100 thousand to 300 thousand times x: less than 100 thousand times

Corrosion Resistance (Product Sheet)

The electrical steel sheet samples provided with the insulating coatings were subjected to a humidity cabinet test (50° C., relative humidity: 100%) to determine red rust areas after 48 hours. Corrosion resistance were evaluated according to the following criteria:

◎: 0 to 20%

○: 20 to 40%

Δ: 40 to 60% x: 60 to 100%

Corrosion Resistance (Annealed Sheet)

The electrical steel sheet samples provided with insulating coatings were annealed at 750° C. for 2 hours in a nitrogen atmosphere and then subjected to an air conditioning test (50° C., relative humidity: 80%) to determine red rust areas after 14 days. The corrosion resistances were evaluated according to the following criteria:

◎: 0 to 20%

○: 20 to 40%

Δ: 40 to 60% x: 60 to 100%

Adhesion Property

Cellophane adhesive tapes were stuck on the surfaces of the electrical steel sheet samples and the stress relief annealed steel sheet samples obtained by subjecting the same electrical steel sheets to annealing treatment at 750° C. for 2 hours in a nitrogen atmosphere and then subjected to a 180° bending and unbending test at 20 mm ϕ. Then, the cellophane adhesive tapes were peeled off to determine flaking areas, and the adhesion properties were evaluated according to the following criteria:

◎: no peeling off

○: peeled off by 20%

Δ: peeled off by 20 to 40% x: peeled off by 40% to whole surface

Sticking Resistance

Samples prepared by laminating each ten electrical steel sheets cut to 50 square mm were annealed at 750° C. for 2 hours in a nitrogen atmosphere while applying a load (200 g/cm$^2$). Then, a weight of 500 g was dropped on the samples to determine the dropping height at which the superposed electrical steel sheets were divided into 5 parts and separated. The sticking resistances were evaluated according to the following criteria:

◎: 10 cm or less

○: 10 to 15 cm

Δ: 15 to 30 cm x: over 30 cm

TABLE 1

| No. | Kind of resin | Kind of silica | Silica weight * | Alkaline metal Kind | Alkaline metal Weight ** | Cl weight *** | S weight *** | Coating weight (g/m$^2$) | |
|---|---|---|---|---|---|---|---|---|---|
| 1 | Acryl | Vapor phase silica | 50 | Na | 0.8 | <0.001 | <0.01 | 1.0 | Invention |
| 2 | Polyethylene/acryl | Colloidal silica | 50 | K, Na | 5.0 | <0.001 | 0.03 | 0.05 | |
| 3 | Acryl/styrene | Colloidal silica | 50 | Li, Na | 0.2 | <0.001 | 0.02 | 4.0 | |
| 4 | Polyethylene/acryl/urethane | Colloidal silica | 3 | Li, Na | 0.2 | 0.005 | 0.05 | 0.8 | |
| 5 | Acryl/acrylonitrile | Colloidal silica | 300 | Na | 0.9 | <0.001 | <0.01 | 0.9 | |
| 6 | Epoxy/acryl | Colloidal silica | 100 | Li, Na | 0.1 | <0.001 | <0.01 | 1.5 | |
| 7 | Polyethylene/acryl | Colloidal silica | 100 | Li, Na | 0.6 | <0.001 | <0.01 | 0.3 | |
| 8 | Polyethylene/acryl | Colloidal silica | 100 | Li, Na | 1.2 | 0.008 | 0.08 | 0.5 | |
| 9 | Acryl | Colloidal silica | 100 | Na | 0.05 | <0.001 | <0.01 | 0.8 | Comparative Example |
| 10 | Acryl/styrene | Colloidal silica | 100 | Na | 8.5 | <0.001 | <0.01 | 1.2 | |

TABLE 1-continued

| No. | Solvent resistance: Hexane | Xylene | Methanol | Ethanol | Corrosion resistance (product sheet) | Corrosion resistance (annealed sheet) | Remarks | |
|---|---|---|---|---|---|---|---|---|
| 1 | ◎ | ◎ | ◎ | ◎ | ○ | ◎ | | Invention |
| 2 | ◎ | ◎ | ◎ | ◎ | ○ | ○ | | |
| 3 | ◎ | ◎ | ◎ | ◎ | ◎ | ◎ | | |
| 4 | ◎ | ◎ | ◎ | ○ | ○ | ○ | | |
| 5 | ◎ | ◎ | ◎ | ◎ | ○ | ◎ | | |
| 6 | ◎ | ◎ | ◎ | ○ | ◎ | ◎ | | |
| 7 | ◎ | ◎ | ◎ | ◎ | ◎ | ◎ | | |
| 8 | ◎ | ◎ | ◎ | ◎ | x | x | | |
| 9 | ◎ | x | x | x | x | ◎ | | Comparative Example |
| 10 | ◎ | ◎ | ◎ | ◎ | Δ | Δ | Whitening in long-term storage | |

* Parts by weight converted to $SiO_2$ per 100 parts by weight of the resin
** Total of parts by weight converted to $M_2O$ (M is alkaline metal) in the coating per 100 parts by weight converted to $SiO_2$. Colloidal silica produced from water glass (sodium silicate was used, and Li, Na and K were added later according to necessity. Accordingly, a small amount of Na was contained in all examples.
* Parts by weight of Cl or S in the coating per 100 parts by weight converted to $SiO_2$ As is apparent from the results shown in Table 1 and FIG. 2 to FIG. 7**, all of the examples of the present invention provide electrical steel sheets provided with the insulating coatings which are excellent in all of the qualities of solvent attach resistance, punchability, adhesion property before and after stress relief annealing, and sticking resistance. The steel sheets in which the amounts of Cl and S were controlled to below the prescribed amounts were excellent in corrosion resistance before and after stress relief annealing as well.

Example 2

The coatings described in Table 2 were formed each on the surface of an electrical steel sheet having a sheet thickness of 0.5 mm. Coating was carried out by a roll coater. The steel sheets were baked at an achievable sheet temperature of 150° C. and left for cooling. Then, the steel sheets were subjected to the respective performance tests. The solvent resistances, the punchabilities, the adhesion properties (product sheets and annealed sheets) and the sticking resistances were measured and evaluated in the same manners as in Example 1.

Film Formability

The electrical steel sheets provided with the insulating coatings were baked at an achievable sheet temperature of 150° C., and then the appearances of the coatings were observed with the naked eye to evaluate the film formabilities according to the following criteria:

◎: uniform appearance is shown, and cracks, blister and stickiness are not found ○: slight cracking and blistering Δ: large cracking and blistering and slight stickiness x: large cracking and blistering and serious stickiness As is apparent from the results shown in Table 2, all of the examples of the present invention provide electrical steel sheets provided with the insulating coatings which are excellent in solvent resistance, punchability, adhesion property before and after stress relief annealing and sticking resistance. In the examples shown in Table 2, only an improvement in the targeted performances are fundamentally intended. Among them, the examples in which other various performances are further improved are included, and various performances which are classified to comparative examples are shown in the remarks.

TABLE 2

| No. | Resin: Kind | Resin: Tg (° C.) | Kind of silica | Silica weight * | Alkaline metal: Kind | Alkaline metal: Weight ** | Coating weight (g/m$^2$) | |
|---|---|---|---|---|---|---|---|---|
| 1 | Acryl | 30 | Colloidal silica | 100 | Li, Na | 0.5 | 1.0 | Invention |
| 2 | Polyethylene/acryl | 150 | Vapor phase silica | 50 | Na | 0.8 | 0.8 | |
| 3 | Epoxy/acryl | 80 | Colloidal silica | 50 | K, Na | 5.0 | 0.05 | |
| 4 | Acryl/styrene | 60 | Colloidal silica | 50 | Li, Na | 0.2 | 4.0 | |
| 5 | polyethylene/acryl/urethane | 80 | Colloidal silica | 3 | Li, Na | 0.2 | 0.8 | |
| 6 | Acryl/acrylonitrile | 40 | Colloidal silica | 300 | Na | 0.9 | 0.9 | |
| 7 | Epoxy/acryl | 110 | Colloidal silica | 100 | Li, Na | 0.1 | 1.5 | |
| 8 | Acryl | 0 | Colloidal silica | 100 | Na | 0.05 | 0.8 | Comparative |
| 9 | Epoxy/acryl | 170 | Colloidal silica | 50 | Li, Na | 0.5 | 0.8 | Example |
| 10 | Acryl | 30 | Colloidal silica | 2 | Li, Na | 0.5 | 0.8 | Invention |
| 11 | Acryl/styrene | 60 | Colloidal silica | 400 | Li, Na | 0.7 | 0.8 | |
| 12 | Acryl/styrene | 60 | Colloidal silica | 50 | Li, Na | 2.2 | 5.0 | |
| 13 | Polyethylene/acryl | 80 | Colloidal silica | 50 | Li, Na | 0.7 | 0.03 | |
| 14 | Acryl/styrene | 60 | Colloidal silica | 100 | Na | 8.5 | 1.2 | Comparative Example |

TABLE 2-continued

| No. | Film formability at a sheet temperature of 150° C. | Solvent resistance Hexane | Xylene | Methanol | Ethanol | Acetone | Punch-ability | Adhesion property (product sheet) | Adhesion property (annealed sheet) | Sticking Resistance | Remark | |
|---|---|---|---|---|---|---|---|---|---|---|---|---|
| 1 | ⊚ | ⊚ | ⊚ | ⊚ | ⊚ | ○ | ⊚ | ⊚ | ⊚ | ⊚ | | Invention |
| 2 | ○ | ⊚ | ⊚ | ⊚ | ⊚ | ⊚ | ⊚ | ⊚ | ⊚ | ⊚ | | |
| 3 | ⊚ | ⊚ | ⊚ | ⊚ | ⊚ | ⊚ | ○ | ⊚ | ⊚ | ○ | | |
| 4 | ⊚ | ⊚ | ⊚ | ⊚ | ⊚ | ⊚ | ⊚ | ○ | ○ | ⊚ | | |
| 5 | ⊚ | ⊚ | ⊚ | ⊚ | ⊚ | ⊚ | ⊚ | ⊚ | ⊚ | ○ | | |
| 6 | ⊚ | ⊚ | ⊚ | ⊚ | ⊚ | ○ | ○ | ○ | ⊚ | ⊚ | | |
| 7 | ⊚ | ⊚ | ⊚ | ⊚ | ⊚ | ⊚ | ⊚ | ⊚ | ⊚ | ⊚ | | |
| 8 | ⊚ | ⊚ | x | x | x | x | ⊚ | ⊚ | ⊚ | ⊚ | | Compara-tive |
| 9 | x | ⊚ | ⊚ | ⊚ | ⊚ | ⊚ | ⊚ | x | ⊚ | ⊚ | | Example |
| 10 | ⊚ | ⊚ | ○ | ○ | ○ | x | ⊚ | ⊚ | ⊚ | x | | Invention |
| 11 | x | ⊚ | ⊚ | ⊚ | ⊚ | ⊚ | x | x | ⊚ | ⊚ | | |
| 12 | x | ⊚ | ⊚ | ⊚ | ⊚ | ⊚ | ⊚ | x | x | ⊚ | | |
| 13 | ⊚ | ⊚ | ⊚ | ⊚ | ⊚ | ⊚ | x | ⊚ | ⊚ | x | | |
| 14 | ⊚ | ⊚ | ⊚ | ⊚ | ⊚ | ○ | ⊚ | ⊚ | ⊚ | ⊚ | Whitening in long-term storage | Compara-tive Example |

* Parts by weight converted to $SiO_2$ per 100 parts by weight of the resin
** Total of parts by weight converted to $M_2O$ (M is alkaline metal) in the coating per 100 parts by weight converted to $SiO_2$. Colloidal silica produced from water glass (sodium silicate) was used, and Li, Na and K were added later according to necessity. Accordingly, a small amount of Na was contained in all examples.

Example 3

The coatings described in Table 2 were formed each on the surface of an electrical steel sheet having a sheet thickness of 0.5 mm. Coating was carried out by a roll coater. The steel sheets were baked at an achievable sheet temperature of 150° C. and left for cooling. Then, the steel sheets were subjected to performance tests. The film formabilities, the solvent resistance, the punchabilities, the corrosion resistance (product sheets and annealed sheets), the adhesion properties (product sheets and annealed sheets) and the sticking resistances were measured and evaluated in the same manners as in Examples 1 and 2.

As is apparent from the results shown in Table 3, all of the examples of the present invention provide electrical steel sheets with insulating coatings which are excellent in solvent resistance, punchability, corrosion resistance before and after stress relief annealing, adhesion property and sticking resistance. In the examples shown in Table 3, only improvements in the targeted performances are fundamentally intended. Among them, the examples in which other various performances are also further improved are included, and various performances which are classified to Comparative Examples are shown in the remarks.

TABLE 3

| No. | Resin Kind | Tg (° C.) | Kind of silica | Silica weight * | Alkaline metal Kind | Weight ** | Cl weight *** | S weight *** | Coating weight (g/m²) | |
|---|---|---|---|---|---|---|---|---|---|---|
| 2-1 | Acryl | 30 | Colloidal silica | 100 | Li, Na | 0.5 | <0.001 | <0.01 | 1.0 | Invention |
| 2-2 | Epoxy/acryl | 150 | Vapor phase silica | 50 | Na | 0.8 | <0.001 | <0.01 | 0.8 | |
| 2-3 | Polyethylene/acryl | 80 | Colloidal silica | 50 | K, Na | 5.0 | <0.001 | 0.03 | 0.05 | |
| 2-4 | Acryl/styrene | 60 | Colloidal silica | 50 | Li, Na | 0.2 | <0.001 | 0.02 | 4.0 | |
| 2-5 | Polyethylene/acryl/urethane | 80 | Colloidal silica | 3 | Li, Na | 0.2 | 0.005 | 0.05 | 0.8 | |
| 2-6 | Acryl/acrylonitrile | 40 | Colloidal silica | 300 | Na | 0.9 | <0.001 | <0.01 | 0.9 | |
| 2-7 | Epoxy/acryl | 110 | Colloidal silica | 100 | Li, Na | 0.1 | <0.001 | <0.01 | 1.5 | |
| 2-8 | Polyethylene/acryl | 80 | Colloidal silica | 100 | Li, Na | 0.6 | <0.001 | <0.01 | 0.3 | |
| 2-9 | Acryl | 0 | Colloidal silica | 100 | Na | 0.05 | <0.001 | <0.01 | 0.8 | Compara- |
| 2-10 | Epoxy/acryl | 170 | Colloidal silica | 50 | Li, Na | 0.5 | <0.001 | <0.01 | 0.8 | tive Example |
| 2-11 | Acryl | 30 | Colloidal silica | 2 | Li, Na | 0.5 | <0.001 | <0.01 | 0.8 | Invention |
| 2-12 | Acryl/styrene | 60 | Colloidal silica | 400 | Li, Na | 0.7 | <0.001 | <0.01 | 0.8 | |
| 2-13 | Acryl/styrene | 60 | Colloidal silica | 50 | Li, Na | 2.2 | <0.001 | <0.01 | 5.0 | |
| 2-14 | Polyethylene/acryl | 80 | Colloidal silica | 50 | Li, Na | 0.7 | <0.001 | <0.01 | 0.03 | |
| 2-15 | Acryl/styrene | 60 | Colloidal silica | 100 | Na | 8.5 | <0.001 | <0.01 | 1.2 | |
| 2-16 | Polyethylene/acryl | 80 | Colloidal silica | 100 | Li, Na | 1.2 | 0.008 | 0.08 | 0.5 | Compara-tive Example |

TABLE 3-continued

| No. | Film formability at a sheet temperature of 150° C. | Solvent resistance Hexane | Solvent resistance Xylene | Solvent resistance Methanol | Solvent resistance Ethanol | Solvent resistance Acetone | Punchability | Corrosion resistance (product sheet) | Corrosion resistance (annealed sheet) | Adhesion property (product sheet) | Adhesion property (annealed sheet) | Sticking resistance | |
|---|---|---|---|---|---|---|---|---|---|---|---|---|---|
| 2-1 | ◎ | ◎ | ◎ | ◎ | ◎ | ○ | ◎ | ○ | ◎ | ◎ | ◎ | ◎ | Invention |
| 2-2 | ○ | ◎ | ◎ | ◎ | ◎ | ◎ | ◎ | ◎ | ◎ | ◎ | ◎ | ◎ | |
| 2-3 | ◎ | ◎ | ◎ | ◎ | ◎ | ◎ | ○ | ○ | ○ | ◎ | ◎ | ○ | |
| 2-4 | ◎ | ◎ | ◎ | ◎ | ◎ | ◎ | ◎ | ◎ | ◎ | ○ | ○ | ◎ | |
| 2-5 | ◎ | ◎ | ◎ | ◎ | ◎ | ◎ | ◎ | ○ | ○ | ◎ | ◎ | ○ | |
| 2-6 | ◎ | ◎ | ◎ | ◎ | ◎ | ○ | ○ | ○ | ◎ | ○ | ◎ | ◎ | |
| 2-7 | ◎ | ◎ | ◎ | ◎ | ◎ | ◎ | ◎ | ◎ | ◎ | ◎ | ◎ | ◎ | |
| 2-8 | ◎ | ◎ | ◎ | ◎ | ◎ | ◎ | ○ | ◎ | ◎ | ◎ | ◎ | ◎ | |
| 2-9 | ◎ | ◎ | x | x | x | x | ◎ | x | ◎ | ◎ | ◎ | ◎ | Comparative Example |
| 2-10 | x | ◎ | ◎ | ◎ | ◎ | ◎ | ◎ | ◎ | ◎ | x | ◎ | ◎ | |
| 2-11 | ◎ | ◎ | ○ | ○ | ○ | x | ◎ | ◎ | x | ◎ | ◎ | x | Invention |
| 2-12 | x | ◎ | ◎ | ◎ | ◎ | ◎ | x | x | ◎ | x | ◎ | ◎ | |
| 2-13 | x | ◎ | ◎ | ◎ | ◎ | ◎ | ◎ | ◎ | ◎ | x | x | ◎ | |
| 2-14 | ◎ | ◎ | ◎ | ◎ | ◎ | ◎ | x | x | Δ | ◎ | ◎ | x | |
| 2-15 | ◎ | ◎ | ◎ | ◎ | ◎ | ○ | ◎ | Δ | Δ | ◎ | ◎ | ◎ | |
| 2-16 | ◎ | ◎ | ◎ | ◎ | ◎ | ◎ | ◎ | x | x | ◎ | ◎ | ◎ | Comparative Example |

* Parts by weight converted to $SiO_2$ per 100 parts by weight of the resin

** Total of parts by weight converted to $M_2O$ (M is alkaline metal) in the coating per 100 parts by weight converted to $SiO_2$. Colloidal silica produced from water glass (sodium silicate) was used, and Li, Na and K were added later according to necessity. Accordingly, a small amount of Na was contained in all examples.

*** Parts by weight of Cl or S in the coating per 100 parts by weight converted to $SiO_2$

Example 4

Liquids obtained by blending a dispersion type water soluble epoxy resin having a specific surface area of 330 $m^2/g$ obtained by forced emulsion polymerization with alkaline type colloidal silica having a specific surface area of 110 $m^2/g$ in the proportions shown in Table 4 were applied each on the surface of an electrical steel sheet subjected to final finishing annealing containing 0.2% Si and having a sheet thickness of 0.5 mm by means of a roll provided with grooves. The coating weight was controlled by pressing with the rubber roll while targeting 0.5 $g/m^2$. The steel sheets were baked at an achievable sheet temperature of 200° C., followed by subjecting them to performance tests. The adhesion properties (product sheets and annealed sheets), the corrosion resistance (product sheets and annealed sheets) and the solvent resistance were measured and evaluated in the same manners as in Examples 1 and 2.

Sticking Strength by Tensile Test

The steel sheets after coating were superposed by 15 $cm^2$ and baked at 750° C. for 2 hours in a dry nitrogen atmosphere while applying a load of 25 $kg/cm^2$. The sticking strength of the coating was evaluated ($kg/cm^2$) by a tensile test. If the strength was 1 $kg/cm^2$ or less, there were practically no problems.

The quality test results are shown in Table 4.

TABLE 4

| No. | Processing liquid composition: Resin (part by weight) | Processing liquid composition: Silica part by weight) | Specific surface area ratio* (silica/resin) | Adhesion property: Product sheet | Adhesion property: Annealed sheet | Corrosion resistance: Product sheet | Corrosion resistance: Annealed sheet | Sticking strength by tensile test ($kg/cm^2$) | Solvent Resistance (Ethanol) | |
|---|---|---|---|---|---|---|---|---|---|---|
| 1 | 100 | 0 | — | ◎ | x | ◎ | x | 8.9 | x | Comparative Example |
| 2 | 100 | 15 | 0.05 | ◎ | Δ | ◎ | x | 4.1 | x | |
| 3 | 100 | 30 | 0.1 | ◎ | ○ | ◎ | ○ | 1.0 | x | |
| 4 | 100 | 50 | 0.2 | ◎ | ○ | ◎ | ◎ | 0.8 | ○ | Invention |
| 5 | 100 | 100 | 0.3 | ◎ | ○ | ◎ | ◎ | 0.5 | ◎ | |
| 6 | 100 | 200 | 0.7 | ◎ | ○ | ◎ | ◎ | 0.5 | ◎ | |
| 7 | 100 | 300 | 1.0 | ◎ | ○ | Δ | ○ | 0.2 | ◎ | |
| 8 | 100 | 400 | 1.3 | ○ | Δ | x | ◎ | 0.2 | ◎ | Comparative Example |
| 9 | 100 | 500 | 1.7 | x | x | x | ○ | 0.1 | ◎ | |

* Surface area ratio = (silica solid content x specific surface area of silica)/(resin solid content x specific surface area of resin) in processing liquid In Samples No. 1 and 2 in which the content of colloidal silica was less than 30 parts by weight according to the present invention, the sticking strength between the coatings was high, and the sticking resistance after stress relief annealing was not satisfactory. Further, if the content of silica was small, the corrosion resistance after annealing tended to deteriorate due to thermal decomposition of the resin. Sample No. 3 in which the proportion of the surface area of silica did not satisfy the range of the present invention showed inferior solvent resistance. When the amounts of silica were 400 parts by weight and 500 parts by weight each exceeding the range of the present invention, the adhesion properties and the corrosion resistances were inferior.

Example 5

Processing liquids containing water base dispersed resins having different surface areas shown in Table 5 and colloidal silica and comprising 150 parts by weight of silica solid material per 100 parts by weight of the resin solid material were applied each on the same steel sheet as in Example 4 described above by means of a rubber roll provided with grooves so that the dried coating amount was 0.3 g/$m^2$, and then the steel sheets were baked in a hot blast furnace so that the achievable sheet temperature reached 100° C. Then, the steel sheets were subjected to the respective performance tests. The adhesion properties (product sheets and annealed sheets), the corrosion resistance (product sheets and annealed sheets) and the solvent resistance were measured and evaluated in the same manners as in Example 1.

The quality test results are shown in Table 5.

TABLE 5

| | Processing liquid | | | | | | | | | | |
|---|---|---|---|---|---|---|---|---|---|---|---|
| | Water base dispersed resin | | Colloidal silica | | | | | | | | |
| | | Specific surface | | Specific surface | Surface area ratio | Adhesion property | | Corrosion resistance | | Solvent | |
| No. | Composition | resin ($m^2$/g) | Kind of Silica | resin ($m^2$/g) | (silica/resin) | Product sheet | Annealed sheet | Product sheet | Annealed sheet | Resistance (Ethanol) | |
| 1 | Epoxy | 330 | A | 450 | 2.0 | ◎ | ◎ | ◎ | ◎ | ◎ | Invention |
| 2 | Epoxy | 330 | B | 100 | 0.5 | ◎ | ○ | ◎ | ◎ | ◎ | |
| 3 | Epoxy | 330 | D | 20 | 0.1 | ◎ | ○ | ◎ | Δ | x | Comparative Ex. |
| 4 | Epoxy | 120 | B | 100 | 1.3 | ◎ | ◎ | ◎ | ◎ | ◎ | Invention |
| 5 | Epoxy | 120 | D | 20 | 0.3 | ◎ | ◎ | ◎ | ◎ | ○ | |
| 6 | Epoxy/acryl | 70 | A | 450 | 9.6 | ◎ | ○ | ○ | ○ | ◎ | Invention |
| 7 | Epoxy/acryl | 70 | D | 20 | 0.4 | ◎ | ◎ | ○ | ○ | ◎ | |
| 8 | Acryl | 40 | A | 450 | 16.9 | ○ | x | x | ○ | ◎ | Comparative Ex. |
| 9 | Acryl | 40 | B | 100 | 3.8 | ○ | ○ | ○ | ○ | ◎ | Invention |
| 10 | Acryl | 40 | C | 45 | 1.7 | ◎ | ○ | ○ | ○ | ○ | |
| 11 | Polyethylene/acryl | 55 | A | 450 | 12.3 | ◎ | Δ | x | ○ | ○ | Comparative Ex. |
| 12 | Polyethylene/acryl | 55 | B | 100 | 2.7 | ◎ | ◎ | ○ | ○ | ◎ | Invention |
| 13 | Polyethylene/acryl | 55 | D | 20 | 0.5 | ◎ | ◎ | ○ | ○ | ◎ | |

Sample No. 3 in which the ratio (specific surface area of silica×solid matter weight/specific surface area of resin× solid matter weight) of a surface area held by silica contained in the processing liquid to a surface area of the water base dispersed resin did not satisfy the range of the present invention of 0.2 to 10. It was inferior in solvent resistance, and Samples No. 8 and No. 11 were inferior in adhesion property and corrosion resistance. While the baking temperature was as low as 100° C. in the examples of the invention, good solvent resistances were shown.

Example 6

A processing liquid (surface area ratio of silica to the resin=1.9) comprising 150 parts by weight of colloidal silica having a specific surface area of 90 $m^2$ per 100 parts by weight of an epoxy-acryl copolymer emulsion resin having a specific surface area of 70 $m^2$ was applied on a general cold rolled steel sheet having a sheet thickness of 0.5 mm subjected to final finishing annealing and skin pass rolling in a continuous annealing line by means of a rubber roll provided with grooves so that the dried coating amount fell in a range of 0.05 to 3 g/$m^2$, and then the steel sheet was baked in a hot blast furnace so that the achievable sheet temperature reached 100° C. The adhesion properties (product sheets and annealed sheets), the corrosion resistances (product sheets and annealed sheets) and the sticking strengths were measured and evaluated in the same manners as in Examples 1 and 4.

The quality test results are shown in Table 6.

TABLE 6

| No. | Coating weight (g/$m^2$) | Adhesion property: Product sheet | Adhesion property: Annealed sheet | Corrosion Resistance: Product sheet | Corrosion Resistance: Annealed sheet | Sticking strength by tensile test (kg/$cm^2$) | Remark |
|---|---|---|---|---|---|---|---|
| 1 | 0.05 | ◎ | ○ | Δ | x | 11.1 | Comparative Example |
| 2 | 0.1 | ◎ | ○ | ○ | ○ | 0.7 | Invention |
| 3 | 0.2 | ◎ | ○ | ◎ | ○ | 0.3 | |
| 4 | 0.5 | ◎ | ○ | ◎ | ○ | 0.5 | |

TABLE 6-continued

| No. | Coating weight (g/m²) | Adhesion property: Product sheet | Adhesion property: Annealed sheet | Corrosion Resistance: Product sheet | Corrosion Resistance: Annealed sheet | Sticking strength by tensile test (kg/cm²) | Remark | |
|---|---|---|---|---|---|---|---|---|
| 5 | 1.0 | ◎ | ○ | ◎ | ○ | 0.2 | | |
| 6 | 2.0 | ◎ | ○ | ◎ | ◎ | 0.2 | | |
| 7 | 3.0 | ◎ | x | ◎ | ◎ | 0.2 | blackened after annealing | Comparative Example |

Samples No. 2 to 6 of the invention showed good sticking resistances and were excellent as well in an adhesion property and corrosion resistance as compared with those of Sample No. 1. While Sample No. 7 in which the coating amount was in excess had excellent corrosion resistance and sticking resistances, excessive carbon formed by decomposition of the resin adhered on the surface of the coating after annealing, and it in turn adhered on a cellophane adhesive tape, so that the adhesion property was deteriorated.

Example 7

The coatings described in Table 7 were formed each on the surface of an electrical steel sheet having a sheet thickness of 0.5 mm. Coating was carried out by a roll coater. The steel sheets were baked at an achievable sheet temperature of 150° C. and left for cooling. Then, the steel sheets were subjected to the tests. The film formabilities, the punchabilities, the adhesion properties (product sheets and annealed sheets) and the sticking resistance were measured and evaluated in the same manners as in Examples 1 and 2.

Steam-exposure Resistance

After steam exposure for 30 minutes, the appearances were observed.

◎: no change

○: little change

Δ: slight change (whitening, rust)

x: large change (whitening, rust)

Corrosion Resistance

The product sheets were evaluated by examining for red rust areas after subjecting them to an air conditioning test (50° C., relative humidity: 80%) for 14 days. According to the same test methods as in Example 1, a difference between the evaluation results was not observed.

◎: 0 to less than 5%

○: 5 to less than 15%

Δ: 15 to less than 30% x: 30 to 100%

As is apparent from the results shown in Table 7, all of the examples of the invention provided electrical steel sheets provided with the insulating coatings which were excellent in steam exposure resistance, solvent resistance punchability and stand stress relief annealing. In the examples shown in the Table, only an improvement in the targeted performances are fundamentally intended. Among them, the examples in which other various performances are further improved are included, and various performances which are classified to comparative examples are shown in the remarks.

TABLE 7

| No. | Resin: Kind | Resin: Tg ° C. | Alumina: Stabilizing agent | Alumina: Weight* | Silica weight** | Coating weight g/m² | |
|---|---|---|---|---|---|---|---|
| 1 | Acryl | 30 | Acetic acid | 100 | — | 0.5 | Invention |
| 2 | Epoxy | 150 | Acetic acid | 50 | — | 0.8 | |
| 3 | Acryl | 80 | Acetic acid | 50 | — | 0.05 | |
| 4 | Acryl | 40 | Acetic acid | 50 | — | 4.0 | |
| 5 | Epoxy | 110 | Acetic acid | 3 | — | 0.2 | |
| 6 | Epoxy | 110 | Acetic acid | 300 | — | 1.5 | |
| 7 | Acryl | 40 | Propionic acid | 100 | — | 1.2 | |
| 8 | Acryl | 0 | Acetic acid | 100 | — | 0.8 | Comparative |
| 9 | Epoxy | 170 | Acetic acid | 50 | — | 0.8 | Example |
| 10 | Acryl | 80 | — | — | 100 | 0.5 | |
| 11 | Acryl | 80 | Acetic acid | 1 | — | 0.8 | Invention |
| 12 | Acryl | 40 | Acetic acid | 400 | — | 0.8 | |
| 13 | Acryl | 40 | Acetic acid | 50 | — | 5.0 | |
| 14 | Acryl | 40 | Acetic acid | 50 | — | 0.02 | |
| 15 | Acryl | 40 | Nitric acid | 100 | — | 0.8 | |
| 16 | Acryl | 40 | Hydrochloric acid | 100 | — | 1.2 | |

| No. | Film formability at a sheet temperature of 150° C. | Steam exposure resistance | Solvent resistance: Hexane | Solvent resistance: Xylene | Solvent resistance: Methanol | Solvent resistance: Ethanol | Punchability | Corrosion resistance (product sheet) | Adhesion property (product sheet) | Adhesion property (annealed sheet) | Sticking resistance | |
|---|---|---|---|---|---|---|---|---|---|---|---|---|
| 1 | ◎ | ○ | ◎ | ○ | ○ | ○ | ◎ | ○ | ◎ | ◎ | ◎ | Invention |
| 2 | ○ | ◎ | ◎ | ◎ | ◎ | ◎ | ◎ | ◎ | Δ | ◎ | ◎ | |

TABLE 7-continued

| | | | | | | | | | | | | |
|---|---|---|---|---|---|---|---|---|---|---|---|---|
| 3 | ◎ | ◎ | ◎ | ◎ | ◎ | ◎ | Δ | Δ | ◎ | ◎ | Δ | |
| 4 | ◎ | ○ | ◎ | ◎ | ○ | ○ | ◎ | ◎ | Δ | Δ | ◎ | |
| 5 | ◎ | ◎ | ◎ | ◎ | ◎ | ◎ | ○ | ◎ | ◎ | ◎ | Δ | |
| 6 | ◎ | ○ | ◎ | ◎ | ◎ | ◎ | Δ | ◎ | ◎ | ◎ | ◎ | |
| 7 | ◎ | ○ | ◎ | ◎ | ○ | ○ | ◎ | ◎ | ◎ | ◎ | ◎ | |
| 8 | ◎ | x | ◎ | x | x | x | ◎ | x | ◎ | ◎ | ◎ | Comparative |
| 9 | Δ | ◎ | ◎ | ◎ | ◎ | ◎ | ◎ | Δ | x | ◎ | ◎ | Example |
| 10 | ◎ | x | ◎ | ◎ | ◎ | ◎ | ◎ | ◎ | ◎ | ◎ | ◎ | |
| 11 | ◎ | ◎ | ◎ | ◎ | ◎ | ◎ | ◎ | ◎ | ◎ | ◎ | x | Invention |
| 12 | ◎ | ○ | ◎ | ◎ | ○ | ○ | x | ◎ | ◎ | ◎ | ◎ | |
| 13 | ◎ | ○ | ◎ | ◎ | ○ | ○ | ◎ | ◎ | x | x | ◎ | |
| 14 | ◎ | ○ | ◎ | ◎ | ○ | ○ | x | x | ◎ | ◎ | x | |
| 15 | ◎ | ○ | ◎ | ◎ | ○ | ○ | x | x | ◎ | ◎ | ◎ | |
| 16 | ◎ | ○ | ◎ | ◎ | ○ | ○ | x | x | ◎ | ◎ | ◎ | |

*Parts by weight converted to $AlO_3$ per 100 parts by weight of the resin
**Parts by weight converted to $SiO_2$ per 100 parts by weight of the resin Example 8

The coatings described in Table 8 were each formed on the surface of an electrical steel sheet having a sheet thickness of 0.5 mm. Coating was carried out by a roll coater. The steel sheets were baked at an achievable sheet temperature of 150° C. and left for cooling. Then, the steel sheets were subjected to the respective performance tests. The film formabilities, the steam exposure resistances, the solvent resistances, the punchabilities, the adhesion properties (product sheets and annealed sheets) and the sticking resistances were measured and evaluated in the same manners as in Examples 1, 2 and 7.

Corrosion Resistance

The product sheets and the sheets subjected to annealing at 750° C. for 2 hours in a nitrogen atmosphere were evaluated for red rust areas after subjecting them to an air conditioning test (50° C., relative humidity: 80%) for 14 days. According to the same test methods of the product sheets as in Example 1, a difference between the evaluation results was not observed.

| Product sheets: | Annealed sheets: |
|---|---|
| ◎: 0 to less than 5% | ◎: 0 to less than 20% |
| ○: 5 to less than 15% | ○: 20 to less than 40% |
| Δ: 15 to less than 30% | Δ: 40 to less than 60% |
| x: 30 to 100% | x: 60 to 100% |

As is apparent from the results shown in Table 8, all of the examples of the present invention provided electrical steel sheets with insulating coatings which were excellent in steam exposure resistance, solvent resistance, punchability and stand stress relief annealing and which are excellent in corrosion resistance after annealing in a further preferred embodiment.

TABLE 8

| | Resin | | Alumina-containing silica | | | | | Coating | |
|---|---|---|---|---|---|---|---|---|---|
| | | | Alumina stabilizing | | | | | weight | |
| No. | Kind | Tg ° C. | agent | Alumina weight* | Silica weight** | Total weight*** | Alumina ratio**** | g/m² | |
| 1 | Acryl | 30 | Acetic acid | 5 | 45 | 50 | 11.1 | 0.5 | Invention |
| 2 | Epoxy | 150 | Acetic acid | 10 | 90 | 100 | 11.1 | 0.8 | |
| 3 | Acryl | 80 | Acetic acid | 25 | 25 | 50 | 100.0 | 0.05 | |
| 4 | Acryl | 40 | Acetic acid | 10 | 90 | 100 | 11.1 | 4.0 | |
| 5 | Epoxy | 110 | Acetic acid | 0.1 | 10 | 10.1 | 1.0 | 0.2 | |
| 6 | Epoxy | 110 | Acetic acid | 40 | 260 | 300 | 15.4 | 1.5 | |
| 7 | Acryl | 40 | Propionic acid | 1 | 2 | 3 | 50.0 | 1.2 | |
| 8 | Acryl | 0 | Acetic acid | 10 | 90 | 100 | 11.1 | 0.8 | Compara-tive |
| 9 | Epoxy | 170 | Acetic acid | 10 | 90 | 100 | 11.1 | 0.8 | Example |
| 10 | Acryl | 40 | Acetic acid | 0 | 100 | 100 | 0.0 | 0.8 | |
| 11 | Acryl | 80 | Acetic acid | 0.5 | 1.5 | 2 | 33.3 | 0.8 | Invention |
| 12 | Acryl | 40 | Acetic acid | 100 | 300 | 400 | 33.3 | 0.8 | |
| 13 | Acryl | 80 | Acetic acid | 85 | 15 | 100 | 566.7 | 0.8 | |
| 14 | Acryl | 40 | Acetic acid | 10 | 90 | 100 | 11.1 | 5.0 | |
| 15 | Acryl | 40 | Acetic acid | 1.6 | 14.2 | 15.8 | 11.3 | 0.03 | |
| 16 | Acryl | 40 | Nitricacid | 10 | 90 | 100 | 11.1 | 0.8 | |
| 17 | Acryl | 40 | Hydrochloricacid | 10 | 90 | 100 | 11.1 | 1.2 | |

TABLE 8-continued

| No. | Film formability at a sheet temperature of 150° C. | Steam exposure resistance | Solvent resistance Hexane | Xylene | Methanol | Ethanol | Punchability | Corrosion resistance (product sheet) | Corrosion resistance (annealed sheet) | Adhesion property (product sheet) | Adhesion property (annealed sheet) | Sticking resistance | |
|---|---|---|---|---|---|---|---|---|---|---|---|---|---|
| 1 | ⊚ | ⊚ | ⊚ | ○ | ○ | ○ | ⊚ | ⊚ | ⊚ | ⊚ | ⊚ | ⊚ | Invention |
| 2 | ○ | ⊚ | ⊚ | ⊚ | ⊚ | ⊚ | ⊚ | ⊚ | ⊚ | ⊚ | ⊚ | ⊚ | |
| 3 | ⊚ | ○ | ⊚ | ⊚ | ⊚ | ⊚ | Δ | Δ | ⊚ | ⊚ | ⊚ | Δ | |
| 4 | ⊚ | ⊚ | ⊚ | ⊚ | ○ | ○ | ⊚ | ⊚ | ⊚ | ⊚ | ⊚ | ⊚ | |
| 5 | ⊚ | ○ | ⊚ | ⊚ | ⊚ | ⊚ | ○ | ○ | ⊚ | ⊚ | ⊚ | ○ | |
| 6 | ⊚ | ⊚ | ⊚ | ⊚ | ⊚ | ⊚ | Δ | ○ | ⊚ | ⊚ | ⊚ | ⊚ | |
| 7 | ⊚ | ⊚ | ⊚ | ⊚ | ○ | ○ | ⊚ | ⊚ | ⊚ | ⊚ | ⊚ | ○ | |
| 8 | ⊚ | x | ⊚ | ⊚ | Δ | Δ | ⊚ | x | ⊚ | ⊚ | ⊚ | ⊚ | Comparative Example |
| 9 | Δ | ⊚ | ⊚ | ⊚ | ⊚ | ⊚ | ⊚ | Δ | ⊚ | x | ⊚ | ⊚ | |
| 10 | ⊚ | x | ⊚ | ⊚ | ○ | ○ | ⊚ | ⊚ | ⊚ | ⊚ | ⊚ | ⊚ | |
| 11 | ⊚ | ⊚ | ⊚ | ⊚ | ⊚ | ⊚ | ⊚ | ⊚ | x | ⊚ | ⊚ | x | Invention |
| 12 | ⊚ | ⊚ | ⊚ | ⊚ | ○ | ○ | x | x | ⊚ | ⊚ | ⊚ | ⊚ | |
| 13 | ⊚ | ⊚ | ⊚ | ⊚ | ⊚ | ⊚ | ⊚ | ⊚ | x | ⊚ | ⊚ | ⊚ | |
| 14 | ⊚ | ⊚ | ⊚ | ⊚ | ○ | ○ | ⊚ | ⊚ | ⊚ | x | x | ⊚ | |
| 15 | ⊚ | ○ | ⊚ | ⊚ | ○ | ○ | x | x | ⊚ | ⊚ | ⊚ | x | |
| 16 | ⊚ | ○ | ⊚ | ⊚ | ○ | ○ | ⊚ | x | x | ⊚ | ⊚ | ⊚ | |
| 17 | ⊚ | ○ | ⊚ | ⊚ | ○ | ○ | ⊚ | x | x | ⊚ | ⊚ | ⊚ | |

*Parts by weight converted to $Al_2O_3$ per 100 parts by weight of the resin
**Parts by weight converted to $SiO_2$ per 100 parts by weight of the resin
***Parts by weight converted to $Al_2O_3$ + $SiO_2$ per 100 parts by weight of the resin
****Parts by weight converted to $Al_2O_3$ per 100 parts by weight of $SiO_2$

What is claimed is:

1. An electrical steel sheet capable of stress relief annealing and having excellent solvent attack resistance comprising an electrical steel sheet, an insulating coating being low in phosphate content and being applied directly to said steel sheet, said insulating coating comprising a water-based resin selected from the group consisting of acryl, alkyd, polyolefin, styrene, vinyl acetate, epoxy, phenol, urethane, melamine resins and polyesters, and mixtures thereof, said resin comprising a single layer and having a glass transition temperature or a softening point of about 30–150° C., and said single layer further comprising an inorganic colloid selected from the group consisting of silica, alumina, alumina-containing silica and mixtures thereof, the ratio of said colloid to said resin being 3–300 parts by weight, based upon solid weight, to 100 parts by weight of said resin, said resin of said insulating coating being applied directly to said steel sheet, and wherein said insulating coating contains substantially no hexavalent chromium component and can be baked at a low sheet steel temperature of about 50 to 250° C., and wherein, in the case the inorganic colloid comprises silica, said insulating coating further comprises at least one alkali metal selected from the group consisting of Li, Na, K in an amount of about 0.1 to 5 parts by weight expressed as $M_2O$, wherein M is the alkali metal, per 100 parts by weight of silica expressed as $SiO_2$, and said insulating coating has a sulfur content limited to 0–0.05 parts by weight of sulfur per 100 parts by weight of silica expressed as $SiO_2$.

2. The electrical steel sheet defined in claim 1, wherein said inorganic colloid comprises silica and wherein Cl is present in said insulating coating in an amount of zero to about 0.005 part by weight per 100 parts by weight of silica expressed as $SiO_2$.

3. The electrical steel sheet defined in claim 1 wherein said coating comprises silica and resin crosslinked in the presence of alkali metal selected from the group consisting of $Li_2O$, $Na_2O$ and $K_2O$ in an amount of 0.1–3 parts by weight, expressed as $M_2O$, per 100 parts by weight of silica expressed as $SiO_2$.

4. The electrical steel sheet defined in claim 1, wherein said inorganic colloid is alumina.

5. The electrical steel sheet defined in claim 1, wherein said inorganic colloid is alumina-containing silica, and wherein said resin has a glass transition temperature of about 30 to 150° C.

6. The electrical steel sheet defined in claim 4, wherein an organic acid is present in said insulating coating as a stabilizing agent for alumina.

7. The electrical steel sheet defined in claim 5, wherein an organic acid is present in said insulating coating as a stabilizing agent for alumina.

8. The electrical steel sheet defined in claim 5, wherein the amount of alumina contained in said insulating coating is about 0.01 to 500 parts by weight expressed as $Al_2O_3$ per 100 parts by weight of silica expressed as $SiO_2$.

9. An electrical steel sheet capable of stress relief annealing and having excellent solvent attack resistance comprising:

an electrical steel substrate;

an insulating coating deposited and adhered in direct contact to said electrical steel substrate, said insulating coating consisting essentially of:

a water-based resin selected from the group consisting of acryl, alkyd, polyolefin, styrene, vinyl acetate, epoxy, phenol, urethane, melamine resins and polyesters, and mixtures thereof, said water-based resin being formed as a single layer and having a glass transition temperature or a softening point of about 30–150° C.; and an inorganic colloid selected from the group consisting of silica, alumina alumina-containing silica, and mixtures thereof, wherein the ratio of said colloid to said resin in said single layer is 3–300 parts by weight, based upon solid weight, to 100 parts by weight of the resin, wherein said insulating coating is capable of effective baking at a sheet steel temperature of about 50 to 250° C., and wherein, in the case the inorganic colloid comprises silica, said insulating coating further comprises at least one alkali metal selected from the group consisting of Li, Na, K in an amount of about 0.1 to 5 parts by weight expressed as $M_2O$, where M is the alkali metal, per 100 parts by weight of silica expressed as $SiO_2$.

10. The electrical steel sheet of claim 9, wherein Cl is present in said insulating coating in an amount of 0.005 part by weight or less, and wherein silica and S are present in said coating and S is present in an amount of 0.05 part by weight or less per 100 parts by weight of silica expressed as $SiO_2$.

11. The electrical steel sheet of claim 9, wherein said inorganic colloid comprises alumina-containing silica and the amount of alumina in said insulating coating is 0.01 to 500 parts by weight, expressed as $Al_2O_3$, per 100 parts by weight of silica expressed as $SiO_2$.

12. The electrical steel sheet defined in claim 9, wherein, when the inorganic colloid contains alumina, an organic acid is present in said insulating coating and comprises a stabilizing agent for alumina.

13. The electrical steel sheet defined in claim 9 wherein the coating amount of said insulating coating is about 0.05 to 4 g/$m^2$.

14. An electrical steel sheet capable of stress relief annealing and having excellent solvent attack resistance comprising:

an electrical steel substrate;

an insulating coating deposited and adhered in direct contact to said electrical steel substrate, said insulating coating comprising:

a resin having a glass transition temperature or a softening point of 30 to 150° C. formed as a single layer, said single layer further comprising an inorganic colloid satisfying at least any one of the following (1) to (3) criteria:

(1) said inorganic colloid comprises colloidal silica, and said single layer further comprises at least one alkali metal selected from the group consisting of Li, Na, K in an amount of about 0.1 to 5 parts by weight expressed as $M_2O$, where M is the alkali metal, per 100 parts by weight of silica expressed as $SiO_2$, (2) said inorganic colloid comprises colloidal alumina, and said single layer further comprises an organic acid as a stabilizing agent for alumina, and (3) said inorganic colloid comprises colloidal alumina-containing silica, and said single layer further comprises an organic acid as a stabilizing agent for alumina, and wherein said insulating coating contains no hexavalent chromium component and can be baked at a low sheet steel temperature of about 50 to 250° C.

15. The electrical steel sheet defined in claim 14, wherein the single layer satisfies the condition (3), wherein in colloidal alumina-containing silica, a minimum amount of alumina covers the surface of silica.

16. The electrical steel sheet defined in claim 14, wherein said inorganic colloid and resin are present in an amount of about 3–300 parts by weight of said colloid, expressed in terms of the solid content, to 100 parts by weight of said resin.

17. The electrical steel sheet defined in claim 14, wherein said coating is applied to said steel sheet in an amount of about 0.05–4g/$m^2$ expressed as dry weight per single coated sheet surface.

18. The electrical steel sheet defined in claim 14, wherein said single layer satisfies the condition (1), and wherein Cl is present in said insulating coating in an amount in the range of zero to about 0.005 part by weight, and S is present in an amount in the range of zero to about 0.05 parts by weight, each per 100 parts weight of silica expressed as $SiO_2$.

19. The electrical steel sheet defined in claim 14, wherein said single layer satisfies the condition (1), and wherein silica is present in said insulating coating in an amount of 3 to 300 parts by weight expressed as $SiO_2$ per 100 parts weight of said resin.

20. The electrical steel sheet defined in claim 14, wherein said single layer at least satisfies conditions (2) or (3), and wherein the amount of alumina and alumina-containing silica present in said insulating coating is about 3 to 300 parts by weight expressed as $Al_2O_3$+$SiO_2$ per 100 parts by weight of said resin.

21. The electrical steel sheet defined in claim 14, wherein said single layer satisfies condition (3), and wherein the amount of alumina present in said insulating coating is about 0.01 to 500 parts by weight expressed as $Al_2O_3$ per 100 parts by weight of silica expressed as $SiO_2$.

22. The electrical steel sheet defined in claim 14, wherein said insulation coating is formed by applying to said steel sheet a coating liquid which contains the inorganic colloid and a resin.

* * * * *

UNITED STATES PATENT AND TRADEMARK OFFICE

CERTIFICATE OF CORRECTION

PATENT NO. : 6,638,633 B1
DATED : October 28, 2003
INVENTOR(S) : Komori et al.

It is certified that error appears in the above-identified patent and that said Letters Patent is hereby corrected as shown below:

Column 7,
Line 28, please delete “10” after “resins,”;
Line 32, please delete “15” after “may”; and
Line 33, after “Colloidal” please delete “”.

Column 8,
Line 39, please delete “20” after “external”.

Column 13,
Line 29, please change “attach” to -- attack --.

Column 26,
Line 52, please change “$Al_{203}$” to -- $Al_2O_3$ --.

Column 27,
Line 2, please insert -- , -- after “alumina”.

Signed and Sealed this

Fourth Day of May, 2004

JON W. DUDAS
*Acting Director of the United States Patent and Trademark Office*